(12) United States Patent
Quick et al.

(10) Patent No.: US 6,180,909 B1
(45) Date of Patent: Jan. 30, 2001

(54) APPARATUS AND METHOD FOR SEALING FLUID FILTER BY INFRARED HEATING

(75) Inventors: Nathaniel R. Quick, Lake Mary, FL (US); Tao Li, Newark, DE (US); Robert Malanga, Monroe, CT (US); Vinod K. Sikka; Craig A. Blue, both of Oak Ridge, TN (US)

(73) Assignee: USF Filtration and Separations Group, Inc., Timonium, MD (US)

( * ) Notice: Under 35 U.S.C. 154(b), the term of this patent shall be extended for 0 days.

(21) Appl. No.: 09/408,750

(22) Filed: Sep. 30, 1999

Related U.S. Application Data

(60) Provisional application No. 60/102,589, filed on Oct. 1, 1998.

(51) Int. Cl.⁷ .................................................. B01D 29/20
(52) U.S. Cl. ................. 219/85.13; 392/416; 392/411; 228/124.6; 210/493.2; 55/DIG. 5
(58) Field of Search ....................... 219/85.13, 85.12, 219/388; 392/416, 407, 411, 418; 228/124.6; 210/493.2; 55/307, DIG. 5, 527

(56) References Cited

U.S. PATENT DOCUMENTS

| | | | |
|---|---|---|---|
| 2,642,187 | * | 6/1953 | Bell ..................................... 210/493.2 |
| 2,877,903 | * | 3/1959 | Veres ...................................... 55/307 |
| 2,957,235 | * | 10/1960 | Steinberg ........................... 210/493.2 |
| 3,379,000 | * | 4/1968 | Webber et al. ......................... 55/307 |
| 3,490,902 | * | 1/1970 | Fisher ..................................... 55/307 |
| 3,505,038 | * | 4/1970 | Luksch et al. ..................... 55/DIG. 5 |
| 3,716,347 | * | 2/1973 | Bergstrom et al. ..................... 55/307 |
| 4,114,794 | * | 9/1978 | Storms .................................. 228/182 |
| 4,169,059 | * | 9/1979 | Storms ............................... 210/493.1 |
| 4,290,889 | * | 9/1981 | Erickson ............................... 210/484 |
| 4,676,843 | * | 6/1987 | Nazmy ..................................... 419/8 |
| 4,731,184 | | 3/1988 | Ostreicher et al. . |
| 4,769,096 | | 9/1988 | Vander Giesson et al. . |
| 4,875,616 | * | 10/1989 | Nixdorf .................................... 29/88 |
| 4,890,444 | | 1/1990 | Vander Giesson et al. . |
| 5,028,330 | | 7/1991 | Caronia et al. . |
| 5,039,413 | | 8/1991 | Harwood et al. . |
| 5,154,827 | | 10/1992 | Ashelin et al. . |
| 5,230,760 | * | 7/1993 | Tanabe ............................... 156/306.6 |
| 5,350,515 | * | 9/1994 | Stark et al. ........................ 210/493.2 |
| 5,395,039 | * | 3/1995 | Koehler et al. .................... 228/248.5 |
| 5,472,537 | * | 12/1995 | Friel et al. ......................... 210/493.2 |
| 5,545,323 | * | 8/1996 | Koehler et al. .................... 210/493.2 |
| 5,904,846 | * | 5/1999 | Clements et al. ................. 210/493.2 |

FOREIGN PATENT DOCUMENTS 58-137418 * 8/1983 (JP) .
10-37739 * 2/1998 (JP) .

* cited by examiner

*Primary Examiner*—John A. Jeffery
(74) *Attorney, Agent, or Firm*—Frijouf, Rust & Pyle, P.A.

(57) ABSTRACT

An apparatus and method is disclosed for sealing a filter element to a support member. An array of bonding fibers is interposed between the filter element and the support member. Infrared energy is applied for a period of time sufficient to at least partially melt the array of bonding fibers to sinter bond the filter element to the support member.

18 Claims, 9 Drawing Sheets

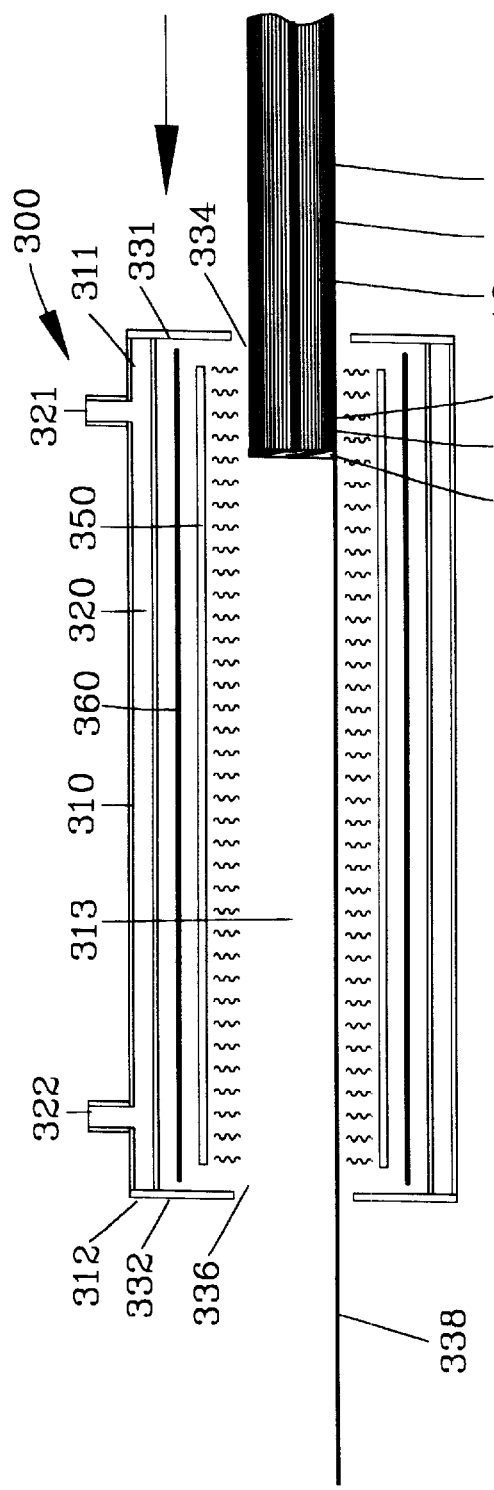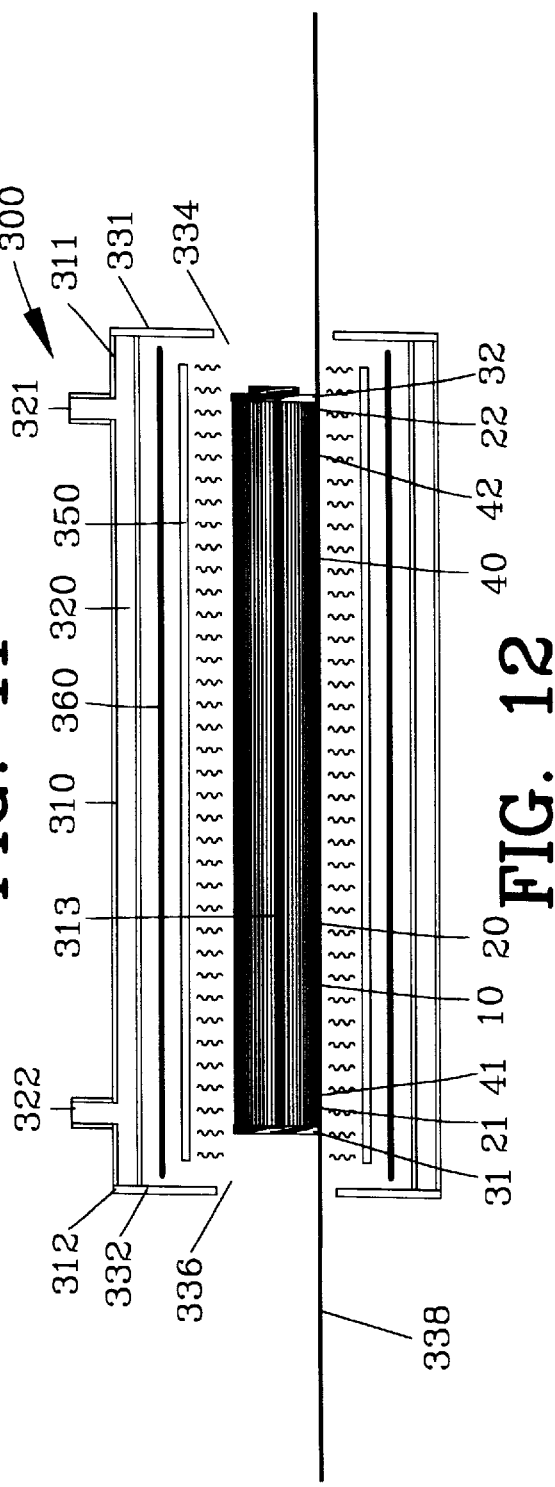

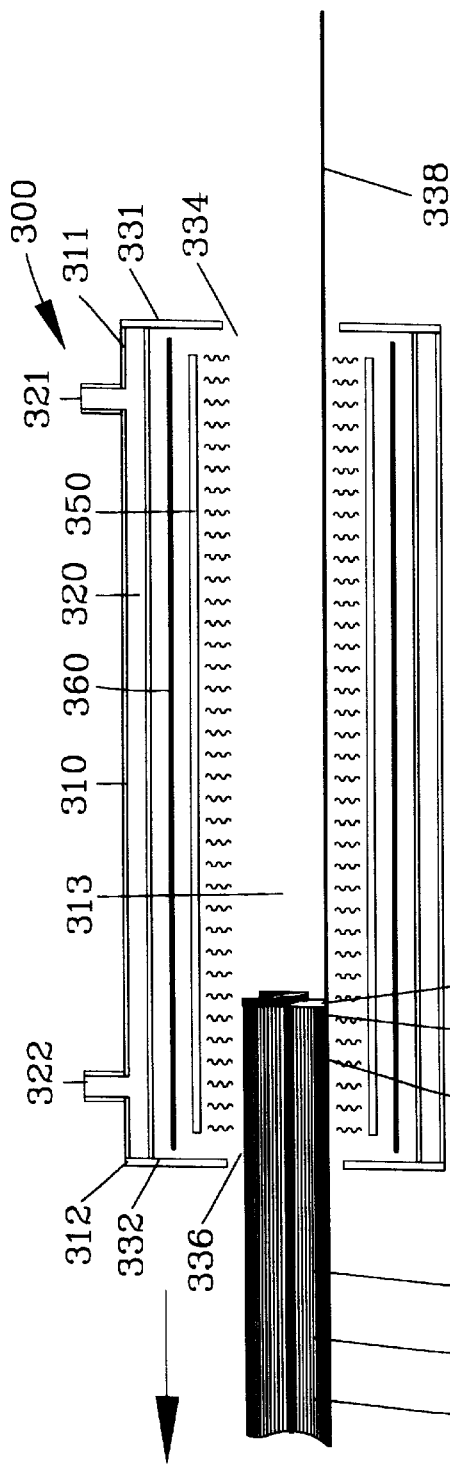
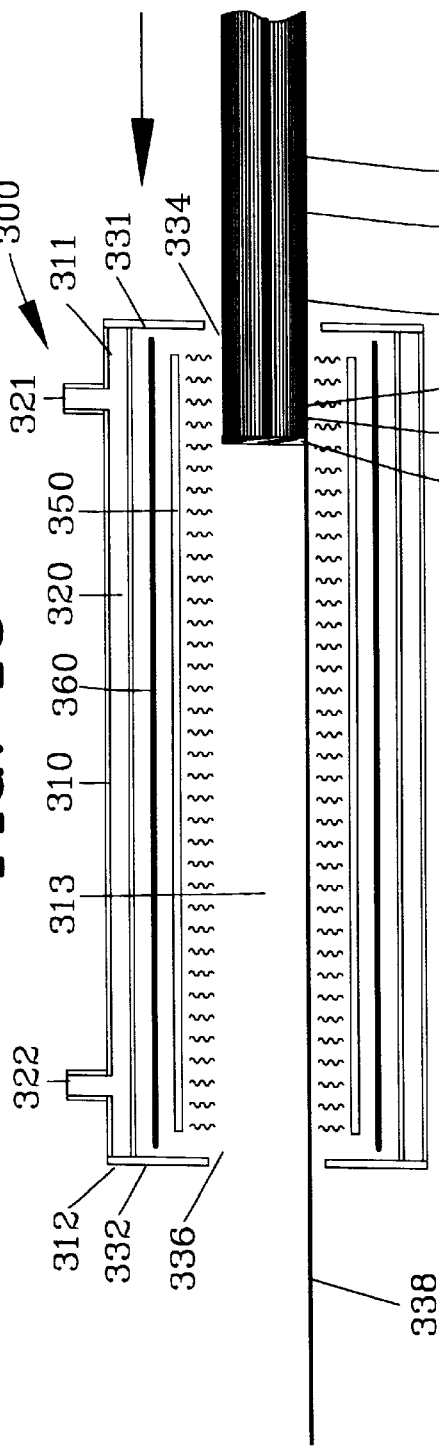

APPARATUS AND METHOD FOR SEALING FLUID FILTER BY INFRARED HEATING

CROSS-REFERENCE TO RELATED APPLICATIONS

This application claims benefit of U.S. Provisional application Ser. No. 60/102,589 filed Oct. 1, 1998. All subject matter set forth in application Ser. No. 60/102,589 is hereby incorporated by reference into the present application as if fully set forth herein.

BACKGROUND OF THE INVENTION

1. Field of the Invention

This invention relates to the filtering of a fluid and more particularly to an apparatus and method for sealing a filter element to a support member by infrared energy.

2. Background of the Invention

In a typical fluid filter, a porous filter media is secured to a support member or the like for mounting or suspending the filter media. In the case of a cylindrical filter, the filter media is formed into a cylindrical configuration and a first and a second cylindrical end of the filter media is bonded to a first and a second support member such as a first and a second end cap. The first and second end caps mount the filter media relative to a fluid input source and a fluid output source. In many cases, a braze material is used for affixing the first and second cylindrical ends of the filter media to the first and second end caps.

In one example of the construction of the fluid filter, the first end cap was placed on the horizontal surface facing upwardly and filled with a braze material. The first end of the filter material was inserted into the braze material contained within the first end cap and the assembly was heated for melting the braze material to bond the first end of the cylindrical filter media to the first end cap. A second end cap was placed on a horizontal surface facing upwardly and was filled with a braze material. The second end of the filter material was inserted within the braze material contained within the second end cap and the assembly was heated for melting the braze material to bond the second end of the cylindrical filter media to the first end cap. A distinct disadvantage of the aforementioned process was that the bonding of both the first and second cylindrical ends of the filter media required two separate and distinct heating processes.

Some in the prior art have used a combination of a powdered first braze material having a first melting point, a powdered second braze material having a second melting point, and a binder material for controlling the position and migration of the powdered braze material during the heating process. The use of the binder material enabled the powdered braze materials to be positioned within an inverted end cap to allow both the first and the second ends of the cylindrical filter media to be bonded to the first and second end caps during a single heating process. The binder material prevented the powder braze materials from being discharged from the inverted end cap. In addition, the binder material inhibited the migration or wicking of the braze material into the filter media during the heating process. The binder material was burnt away leaving only the braze material to bond the first and second ends of the cylindrical filter media to the first and second end caps.

Others in the prior art have used other methods for creating a bond between metallic filter media and another metal component of a filter assembly.

U.S. Pat. No. 2,642,187 to Bell discloses a replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to folds of the pleats, said adhesive lying between inner faces of the turned down rims and the folds of the pleats in contact therewith.

U.S. Pat. No. 2,877,903 to Veres discloses a unit for filtering particulate matter from a fluid flowing therethrough, a hollow filter body comprising a screen equipped with a screen closure at one end thereof, a cap substantially closing the other end of said screen body and defining connecting means for communicating the interior of said filter body with a fluid flow line, and a mass of pellets defining a substantially continuous coating along the outer surface of the screen end closure and screen body and being bonded to each other and to the screen body and end closure to form an integrated structure therewith, whereby both said screen body and screen end closure define filtering areas through which fluid may pass to the interior of the screen body.

U.S. Pat. No. 2,957,235 to Steinberg discloses a method of assembling first and second elements composed of a mixture of powdered metal and resinous binder comprising placing said first element on a support, heating said first element until said resin binder therein becomes pliable without the element losing shape, placing said second element against said first element, applying pressure to said second element until a bond is formed by the resinous binder between said first and second elements, removing the elements from said support, cooling the assembly of said elements, supporting said assembly with sinter material in a sintering zone, and sintering said assembly into a unitary sintered structure.

U.S. Pat. No. 3,379,000 to Webber et al discloses a tow of metal filaments each having a maximum cross-section of less than approximately 10 microns and a length of approximately 50 feet and having a trace amount of a different material diffused in the outer surface thereof.

U.S. Pat. No. 3,490,902 to Fisher discloses a method for forming porous structures useful, for example, as filters, diffusion membranes, sound absorbers, and the like. The structures contain a sintered metal portion at least one surface of which having embedded and bonded thereto a reinforcing member. Some of the fibers in the fiber metal portion are bonded to each other and to the reinforcing member.

U.S. Pat. No. 3,505,038 to Luksch et al. discloses a mass comprising a plurality of randomly disposed hair-like substantially solid metal fibers, wherein said fibers are substantially free from particles of degradation and air transportable, and wherein said mass has resilient loft, substantial uniformity of density and distribution of voids, handlable green strength, and a density range of from one percent to eighty-five percent.

U.S. Pat. No. 3,716,347 to Bergstrom et al. discloses metal parts joined together with sintered powdered metal by applying a mixture of powdered metal and an organic heat-fugitive binder to the parts at the locus of the joint to be formed therebetween, assembling the parts in their desired joined configuration, and heating the assembly to volatilize or burn-off the binder and sinter the powdered metal.

U.S. Pat. No. 4,114,794 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,169,059 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,290,889 to Erickson discloses a new and unique means for preventing the crowns of a backflushable filter element unit from splitting which has heretofore been caused by the cyclic action of the cleaning and backflushing. A layer of staple material is positioned adjacent the outer layer of filter media to prevent bellowing or ballooning. An additional staple layer may be positioned adjacent the inner layer of filtered media to provide additional support. With both staple layers in position on both sides of the filter media, the media is firmly captured and the crowns will not split.

U.S. Pat. No. 4,676,843 to Nazmy discloses two component workpieces consisting of different superalloys or of the same superalloy are bonded together to form a monolithic whole, with the insertion of a layer consisting of a powder of composition similar to or identical to that of the component workpieces by hot pressing in accordance with the diffusion bonding process. The workpiece surfaces to be bonded do not have to have narrow tolerances, but are with advantage provided with grooves. The process is suitable for the bonding together of component workpieces consisting of a dispersion-hardened, nickel-based superalloy or of component workpieces of such an alloy and workpieces consisting of a cast conventional superalloy.

U.S. Pat. No. 4,875,616 to Nixdorf discloses a method for producing a high temperature, high strength bond between a ceramic shape and a metal substrate, such as joining a ceramic cap to a piston for an internal combustion engine. The composite joint is effected through the use of a ceramic preform fabricated using fibers, whiskers, platelets or sponge-like particles having the same composition as the ceramic body. The preform is joined to the ceramic shape by using a ceramic slip having a ceramic corresponding in composition with the ceramic body, with this juncture being heated to achieve a secure bond. The preform is joined to the metal substrate by first infiltrating the preform with molten material corresponding to the substrate, and then pressure bonding the infiltrated preform to the substrate after the molten material has solidified. The substrate can be metal or metal alloy. An example is given for the bonding of silicon carbide to a 300 series aluminum.

U.S. Pat. No. 5,230,760 to Tanabe discloses a filter cartridge of micro filtration membrane pleats type, by which it is possible to stably manufacture products of high quality and to reduce the manufacturing cost. In the method for manufacturing a filter cartridge of micro membrane pleats according to the present invention, an initial portion and a last portion with pleats of a micro filtration membrane are welded together to prepare an endless micro membrane, and a filter element provided with a micro filtration membrane is welded on two end plates. A thin bonding auxiliary plate made of the same material as the end plates, having an opening at its center and molten at relatively low temperature, is welded to filter element and end plates which are heated in advance.

U.S. Pat. No. 5,350,515 to Stark et. al. discloses a filter cartridge including a cylindrical filter medium potted into a top cap, and having an internally potted bottom closure molded in place inside the filter medium.

U.S. Pat. No. 5,395,039 to Koehler et. al. discloses such a braze material and process. The same braze material and process is disclosed by a prior NICROBRAZ Technical Bulletin of 1991 published by the Wall Colmony Corporation regarding a braze material sold under the trademark "NICROBRAZ".

U.S. Pat. No. 5,545,323 to Koehler et al. discloses a filter assembly and a method of making a filter assembly described wherein a filter pack is seated in an end cap and contacted with a particulate material and a settling liquid of low viscosity to form a filter assemblage. The filter assemblage is sintered to form a strong, virtually impermeable bond therebetween.

Another disadvantage of the aforementioned brazing process is the introduction of foreign braze materials into the filter assembly. In many cases, the filter media and the support member are made of the same type of material which is selected to be impervious to the fluids flowing through the filter media. The brazing process introduced braze materials that are dissimilar to the type of material of filter media and end caps. Accordingly, the compatibility of the type of braze material must be considered for use with the fluid to be filtered by the filter media.

The process of removing the contaminants from the filter media involved the flow of a solvent material such as acids, bases and organics or the like through the filter media in a direction opposite to the direction of the fluid through the fluid filter. In some cases, the solvent material was passed through the filter media when the fluid filter was raised to an elevated temperature. The filter media that is capable of being cleaned by a flowing solvent at an elevated temperature must be constructed in an entirely different manner and using entirely different materials in order to withstand the solvent and the elevated temperature.

Therefore, it is an object of this invention to provide an improved apparatus and method of sealing a filter element to a support member incorporating infrared heating.

Another object of this invention is to provide an improved apparatus and method of sealing a filter element to a support member incorporating infrared heating which may be concentrated or focused on desired regions of a filter assembly.

Another object of this invention is to provide an improved apparatus and method of sealing a filter element to a support member incorporating concentrated infrared heating for controlling the movement of a binding material during the heating process.

Another object of this invention is to provide an improved apparatus and method of sealing a filter element to a support member incorporating concentrated infrared heating which inhibits the migration or wicking of the binding material into the filter media during the heating process.

Another object of this invention is to provide an improved apparatus and method of sealing a filter element to a support member incorporating infrared heating for sealing both a first and a second end of the cylindrical filter media to a first and second end caps during a single infrared heating process.

Another object of this invention is to provide an improved apparatus and method of sealing a filter element to a support member incorporating infrared heating for enabling the use of a brazing material without the need of a binder material for controlling the position and migration of the braze material during the heating process.

Another object of this invention is to provide an improved apparatus and method of sealing a filter element to a support member incorporating infrared heating for securing the filter media to the support member through the use of sintered metallic fibers of the same material type as the filter media and the support member.

Another object of this invention is to provide an improved apparatus and method of sealing a filter element to a support member incorporating infrared heating for securing the filter media to the support member through the use of a sintered bonding pad of partially sintered metallic fibers.

Another object of this invention is to provide an improved apparatus and method of sealing a filter element to a support member incorporating infrared heating for securing the filter media to the support member through the use of a sintered bonding fiber such as scrap filter media fibers.

Another object of this invention is to provide an improved apparatus and method of sealing a filter element to a support member incorporating infrared heating for securing the filter media to the support member through the use of a sintered bonding fiber that is capable of withstanding a cleaning solvent and an elevated temperature.

Another object of this invention is to provide an improved apparatus and method of sealing a filter element to a support member incorporating infrared heating to provide a fluid filter assembly having superior sealing characteristics.

Another object of this invention is to provide an improved apparatus and method of sealing a filter element to a support member incorporating infrared heating to provide a fluid filter assembly that is reliable for use over an extended period of time.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an apparatus and method of sealing a filter element to a support member. The apparatus and method comprises interposing an array of bonding fibers between the filter element and the support member. Infrared energy is applied for a period of time sufficient to at least partially melt the array of bonding fibers to sinter bond the filter element to a support member.

In one embodiment of the invention, the step of interposing an array of bonding fibers includes interposing an array of metallic bonding fibers. In another embodiment of the invention, the step of interposing an array of bonding fibers includes interposing a resilient pad formed from a sintered matrix of randomly oriented fibers between the filter element and the support member. Preferably, the step of applying infrared energy includes irradiating with infrared radiation for a period of time sufficient to sinter bond each of the fibers of the array of bonding fibers to an adjacent fiber.

In another embodiment of the invention, the step of applying infrared energy includes irradiating with infrared radiation in either a vacuum, a reactive atmosphere or a non-reactive atmosphere. In one specific example of the invention, the step of applying infrared energy includes irradiating with infrared radiation in a hydrogen atmosphere.

In a further embodiment of the invention, the invention comprises the method of making a fluid filter assembly for filtering a fluid. The method comprises the steps of fabricating a filter media from a matrix of metallic fibers and a support member. An array of metallic bonding fibers is interposed between the filter element and the support member. Infrared energy is applied to at least partially melt the array of metallic bonding fibers to sinter bond the filter element to the support member.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 11 is a sectional view of a variation of the apparatus of FIG. 5 receiving a fluid filter insert on a conveyor;

FIG. 12 is a view similar to FIG. 11 illustrating the irradiation of the entire moving fluid filter insert;

FIG. 13 is a view similar to FIG. 11 illustrating the discharge of the fluid filter insert;

FIG. 14 is a view similar to FIG. 11 illustrating the apparatus receiving a second fluid filter insert on the conveyor;

Similar reference characters refer to similar parts throughout the several Figures of the drawings.

DETAILED DISCUSSION

Figure 1:
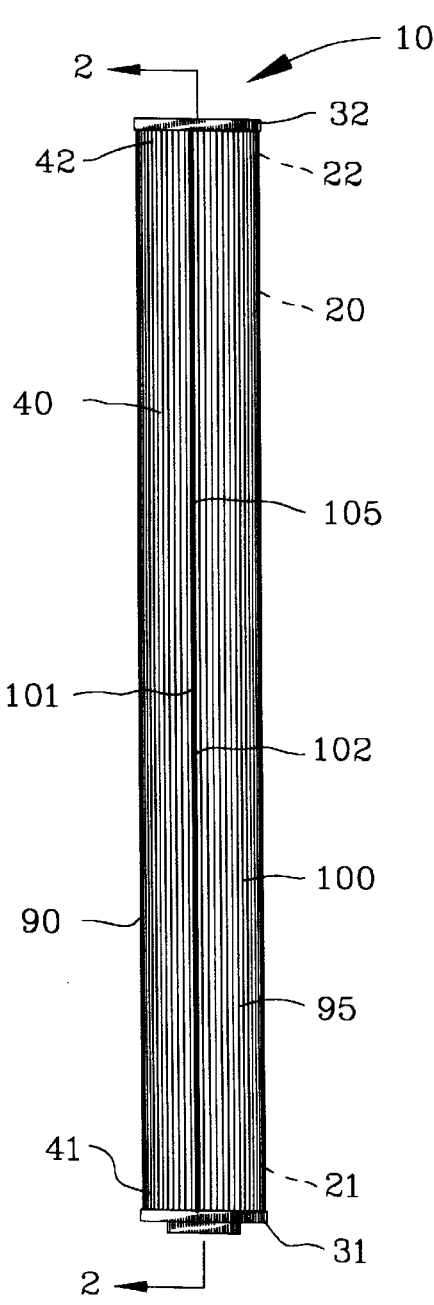
FIG. 1 is a side elevational view of a fluid filter insert.
Figure 2:
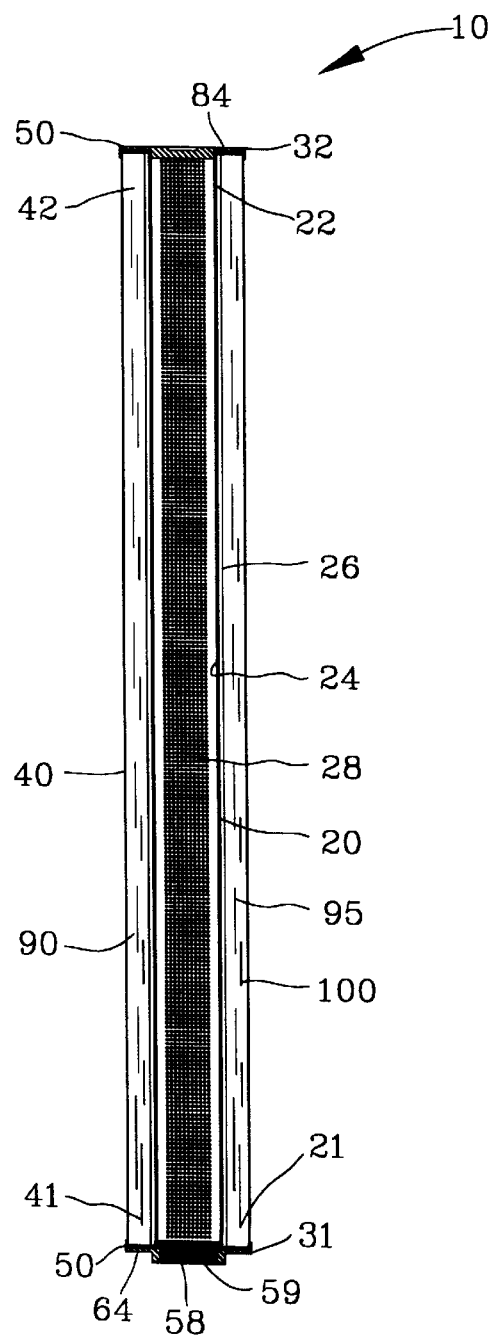
FIG. 2 is a sectional view along line 2—2 in FIG. 1.

FIG. 1 is a side elevational view of the fluid filter insert 10 with FIG. 2 being a sectional view thereof. The fluid filter insert 10 is designed for use within a conventional filter housing (not shown) for filtering suspended contaminants from a fluid. The fluid filter insert 10 comprises a core member 20 extending between a first and a second core end 21 and 22 with the core member 20 being substantially cylindrically defined by an inner and outer cylindrical surface 24 and 26. A plurality of apertures 28 defined within the core member 20 to extend between the inner and outer cylindrical surfaces 24 and 26 for enabling fluid passage therethrough. The core member 20 is disposed between a first and a second support member 31 and 32.

The fluid filter insert 10 comprises a filter media 40 having a first and a second filter media end 41 and 42. The first and second core ends 21 and 22 of the core member 20 and the first and second filter media ends 41 and 42 of the filter media 40 are respectively secured to the first and second support members 31 and 32 by a bonding material 50.

Figure 3:
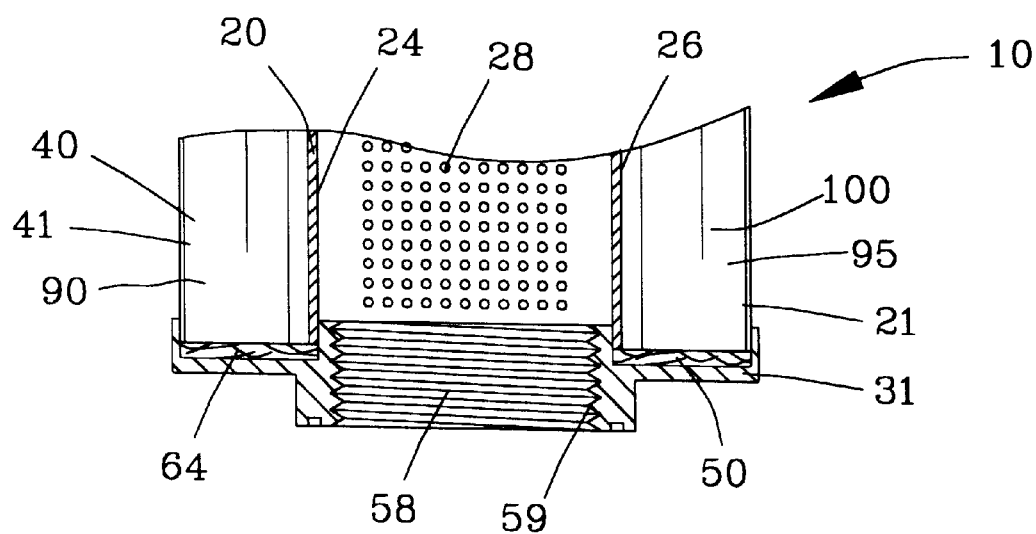
FIG. 3 is an enlarged view of a first portion of FIG. 2 illustrating a first endcap.

FIG. 3 is an enlarged view of a first portion of FIG. 2 illustrating the first support member 31. The first support member 31 comprises a central orifice 58 provided with threads 59 for affixing the fluid filter insert 10. The central orifice 58 provides communication to the interior of the core 20. A first annular recess 64 has a general cup-shape defined within the first support member 31 for retaining the bonding material 50 therein.

The first core end 21 of the core member 20 and the first filter media end 41 of the filter media 40 are disposed within the first annular recess 64. The bonding material 50 is disposed within the first annular recess 64 for securing first core end 21 of the core member 20 and the first filter media end 41 of the filter media 40 to the first support member 31.

Figure 4:
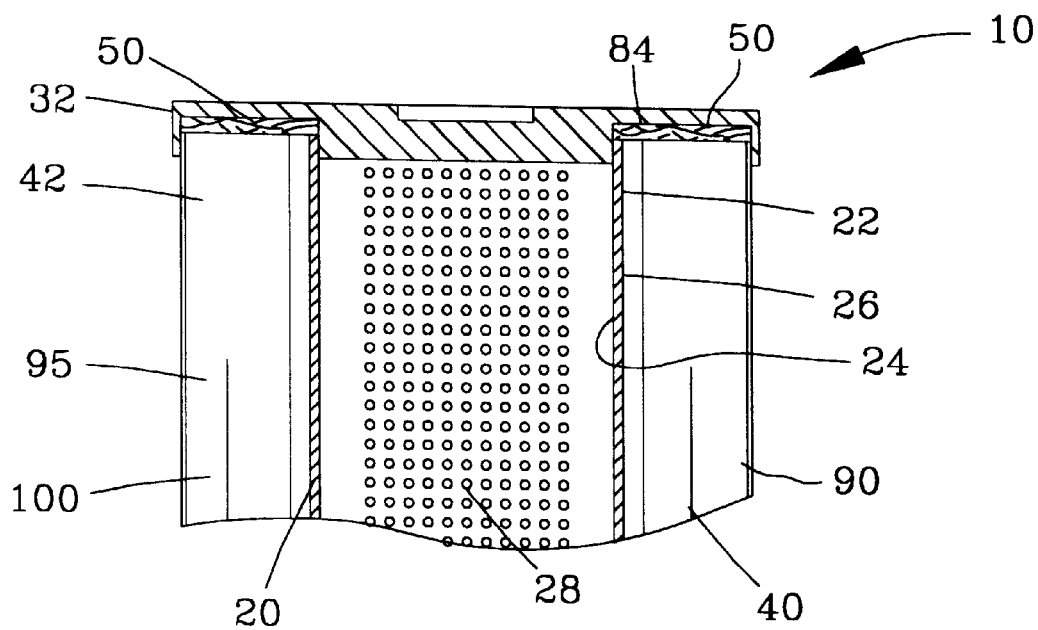
FIG. 4 is an enlarged view of a second portion of FIG. 2 illustrating a second endcap.

FIG. 4 is an enlarged view of a second portion of FIG. 2 illustrating the second support member 32. The second support member 32 comprises a second annular recess 84 having a general cup-shape defined within the second support member 32 for retaining the bonding material 50 therein. The second core end 22 of the core member 20 and the second filter media end 42 of the filter media 40 are disposed within the second annular recess 84. The bonding material 50 is disposed within the second annular recess 84 for securing the second core end 22 of the core member 20 and the second filter media end 42 of the filter media 40 to the second support member 32.

The first annular recess 64 retains the bonding material 50 enabling the first core end 21 of the core member 20 and the first filter media end 41 of the filter media 40 to be mechanically inserted into the bonding material 50. In a similar manner, the second annular recess 84 retains the bonding material 50 enabling the second core end 22 of the core member 20 and the second filter media end 42 of the filter media 40 to be mechanically inserted into the bonding material 50.

The first and second core ends 21 and 22 of the cylindrical core member 20 are secured to the first and second support members 31 and 32 for enabling fluid communication between the central orifice 58 of the first support member 31 and the outer cylindrical surface 26 of the core member 20 through the plurality of apertures 28 therein.

The filter media 40 is shown as generally cylindrical and coaxially disposed relative to the cylindrical core member 20. The filter media 40 defines a generally pleated or accordion shape for increasing the surface area of the filter media 40. The filter media 40 filters suspended contaminates in the fluid flowing through the filter media 40 via the central orifice 58 of the first support member 31 and the plurality of apertures 28 of the core member 20.

The filter media 40 comprises a matrix of metallic fibers with each of the metallic fibers 90. The metallic fibers 90 are formed into a compressed sintered matrix of randomly oriented metallic fibers 90 to provide a porous filter media 40.

In one example, the filter media 40 comprises a sintered matrix of small diameter metallic fibers such as stainless steel fibers 90. The small diameter stainless steel fibers 90 are formed through a wire drawing process having a diameter of less than 100 microns. The wire drawing process provides a uniform diameter of small diameter stainless steel fibers 90. The uniform diameter of small diameter stainless steel fibers 90 provides a uniform filtering of the suspended contaminants from the fluid.

The metallic fibers 90 are formed by cladding and drawing a plurality of metallic wires for providing a drawn cladding with a reduced diameter. Several successive drawing processes may be required to obtain the metallic fibers with the desired diameter. The cladding is removed to provide the small diameter metallic fibers 90 having a length at least one hundred times the diameter.

The metallic fibers 90 are opened to provide loose metallic fibers. The loose metallic fibers 90 are formed into a web 95. The web 95 of small diameter metallic fibers 90 is fused by a sintering process to form the filter media 40 having a multiplicity of pores therein. The sintered filter media 40 is passed through a rolling press to compress the sintered filter media 40 to have a uniform thickness with a high mechanical strength. The compressed sintered filter media 40 is in the form of a sheet 100 having a first and a second end 101 and 102.

The sheet 100 of the sintered filter media 40 of the small diameter metallic fibers 90 is folded into the generally pleated or accordion shape and is bent into the generally cylindrical shape. The first and second ends 101 and 102 are welded at 105 to form the generally cylindrical shape.

Various types of bonding materials 50 have been used in the prior art for securing the first and second core ends 21 and 22 of the core member 20 and the first and second filter media end 41 and 42 of the filter media 40 to the first and second support members 31 and 32. In accordance with the teaching of the NICROBRAZ Technical Bulletin of 1991, supra, a bonding material 50 is a braze material. A binder material is mixed with the braze material to limit the flow of the braze material during the melting and solidification thereof. The use of the binder material enables one of the first and second support members 31 and 32 to be inverted during the melting and solidification of the braze material for allowing the simultaneous heating of the first and second support members 31 and 32. The flow of the braze material during the molten state seals and secures the first and second core ends 21 and 22 of the core member 20 and the first and second filter media ends 41 and 42 to the first and second support members 31 and 32.

In this embodiment of the invention, the bonding material 50 comprises metallic bonding fibers. In one example, the metallic bonding fibers are loose randomly oriented metallic fibers with each of the metallic bonding fibers having a diameter equal or less than each of the metallic fibers 90 of the filter media 40. Preferably, each of the loose metallic fibers has a diameter of less than 50 microns. The loose metallic bonding fibers may be formed through a wire drawing process to provide a uniform diameter thereto.

Upon the application of heat to the assembly, the loose metallic bonding fibers sinter bond the core member 20 and the filter media 40 to the first and second support members 31 and 32. Preferably, the core member 20 and the filter media 40 and the first and second support members 31 and 32 are all constructed of the same type of material as the loose metallic bonding fibers.

In another example, the bonding material 50 comprises a bonding pad of sintered metallic fibers located in the first and second annular recess 64 and 84. The bonding pad comprises a resilient pad formed from a sintered matrix of randomly oriented metallic fibers. Preferably, the resilient bonding pad is an uncompressed sintered matrix of randomly oriented metallic fibers. Preferably, the metallic fibers of the bonding pad have a diameter equal or less than each of the metallic fibers of said filter media 40 and may be formed by a wire drawing process. The bonding pad may be formed of the filter media 40. The bonding pad may be equivalent to the structure of the filter media 40 having a basis weight of 2.0 to 50.0 ounces per yard.

Upon the application of heat, the metallic fibers of the bonding pad sinter bond the core member 20 and the filter media 40 to the first and second support members 31 and 32. Preferably, the core member 20 and the filter media 40 and the first and second support members 31 and 32 are all constructed of the same type of material as the loose metallic bonding fibers.

Figure 5:
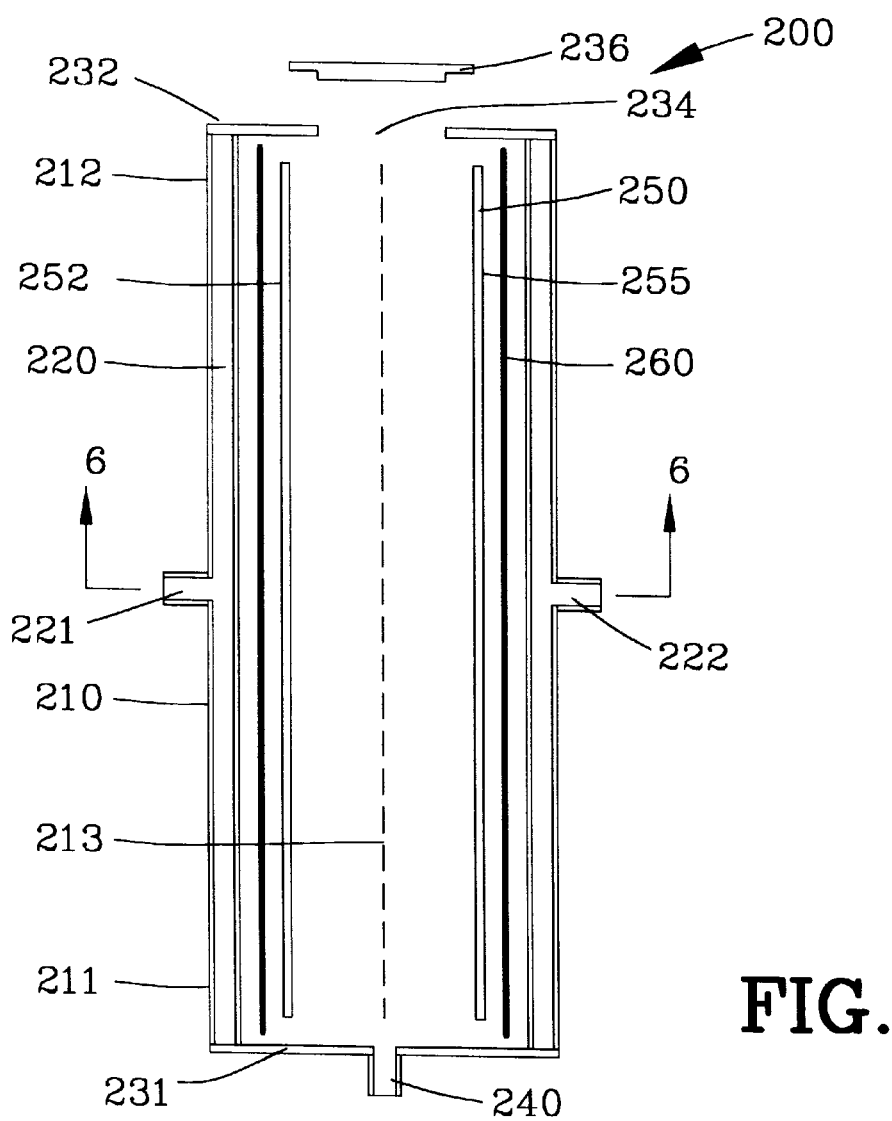
FIG. 5 is a sectional view of an apparatus for bonding endcaps to a filter media of the fluid filter insert.

FIG. 5 is a sectional view of an apparatus 200 of heating the bonding material 50 for securing the first and second core ends 21 and 22 of the core member 20 and the first and second filter media ends 41 and 42 of the filter media 40 to the first and second support member 31 and 32. The apparatus 200 comprises a body 210 having a first and a second end 211 and 212.

Figure 6:
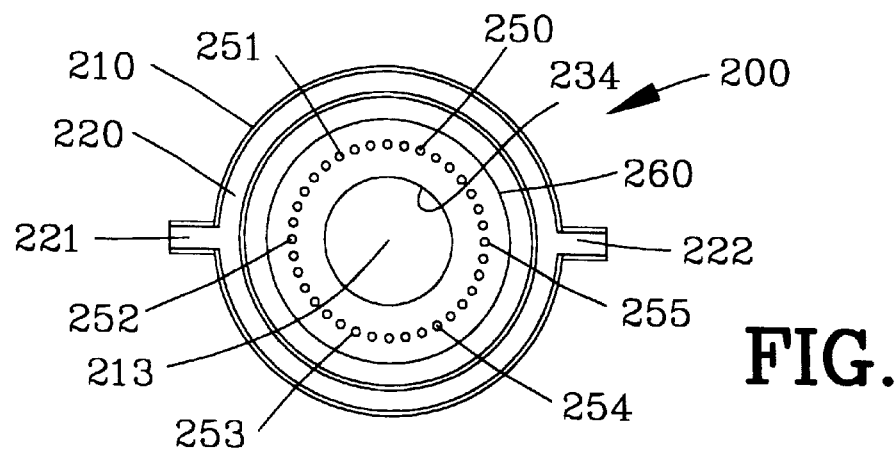
FIG. 6 is a sectional view along line 6—6 in FIG. 5.

FIG. 6 is a sectional view of FIG. 5 illustrating the body 210 as being generally cylindrical about a central axis 213. Preferably, the body 210 includes a cylindrical cooling reservoir 220 communicating with an input and an output conduit 221 and 222. A cooling fluid (not shown) is circulated through the cooling reservoir 220 through the input and output conduits 221 and 222 for cooling the body 210.

The body 210 includes a first cylindrical end wall 231 for enclosing the first end 211 of the body 210. A second cylindrical end wall 232 defines an aperture 234 for enabling the introduction and removal of the fluid filter insert 10 shown in FIGS. 1 and 2. A closure 236 is provided for closing the aperture 236 in a gas tight seal. Preferably, the body 210 is provided with a gas port 240 for removing and/or replacing the atmosphere internal the body 210. The gas port 240 may be used to provide a vacuum environment within the body 210 and/or may be used for introducing a non-reactive gas or a reactive gas environment within the body 210.

An array of infrared lamps 250 is located within the body 210. The array of infrared lamps 250 includes infrared lamps 251–254 symmetrically disposed about the cylindrical axis 213 of the body 210. A cylindrical reflector 260 is interposed between the array of infrared lamps 250 and the cooling reservoir 220. The cylindrical reflector 260 reflects infrared radiation emanating outwardly relative to be cylindrical axis 213 and redirect the outwardly emanating infrared radiation toward the cylindrical axis 213.

Figures 7, 8:
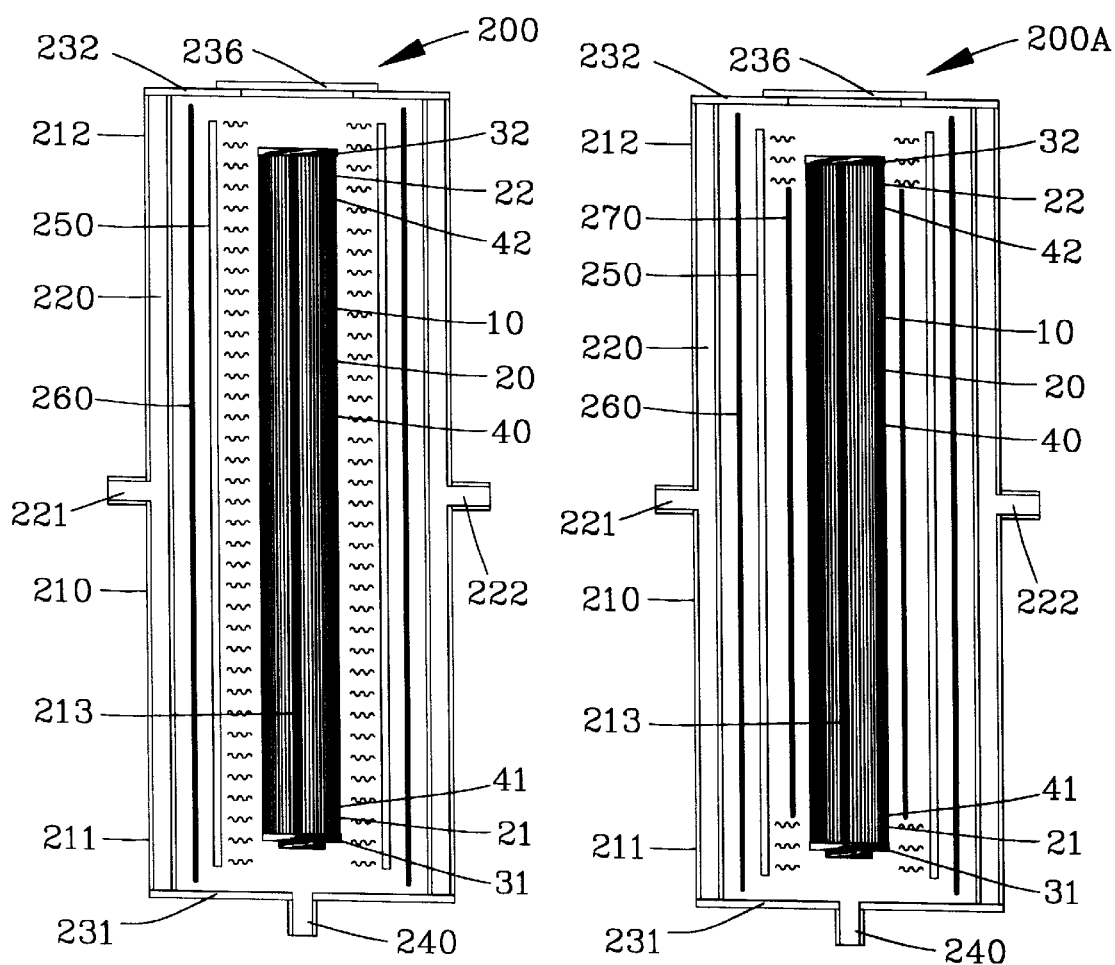
FIG. 7 is a sectional view of the apparatus of FIG. 5 irradiating the entire fluid filter insert for bonding a first and a second endcap to the filter media.
FIG. 8 is a sectional view of a variation of the apparatus of FIG. 5 for irradiating only the first and second portions of the fluid filter insert for bonding the first and second endcaps to the filter media.

FIG. 7 is a sectional view of the apparatus 200 of FIG. 5 irradiating the fluid filter insert 10 of FIGS. 1 and 2. The fluid filter insert 10 is received within the body 210 to be coaxial with the cylindrical axis 213. Upon energizing the array of infrared lamps 250, infrared energy is directed for heating the fluid filter insert 10. The array of infrared lamps 250 is energized for a period of time sufficient to at least partially melt the array of bonding material 50 to sinter bond the first and second core ends 21 and 22 of the core member 20 and the first and second filter media ends 41 and 42 of the filter media 40 to the first and second support members 31 and 32.

Since the entirety of the fluid filter insert 10 is irradiated by the array of infrared lamps 250, the infrared energy is applied to the filter media 40. The infrared energy applied to the filter media 40 provides a supplemental sintering of the filter media 40. Typically, the filter media 40 is only partially sintered in order to allow the sheet 100 of the sintered filter media 40 to be folded into the generally pleated accordion shape and bent into the generally cylindrical shape as shown in FIG. 1. The supplemental sintering of the filter media 40 provides additional strength to the filter media 40 and the fluid filter insert 10.

Preferably, a fluid filter insert 10 is irradiated with infrared energy having a wavelength greater than 700 nm. However, it should be appreciated by those skilled in the art that the infrared energy may be selected to have other suitable wavelengths.

FIG. 8 is a sectional view of an apparatus 200A which is a modification of the apparatus 200 illustrated in FIG. 7. In this embodiment of the invention, a shield 270 is interposed between the array of infrared lamps 250 and the fluid filter insert 10. The shield 270 masks the central portion of the fluid filter insert 10 while allowing the infrared energy to impinge upon the first and second support members 31 and 32. In some instances, it is desirable to irradiate only the end portions of the fluid filter insert 10 without irradiating the central portion thereof. The shield 270 reflects the infrared radiation that would normally impinge upon the central portion of the fluid filter insert 10.

Figures 9, 10:
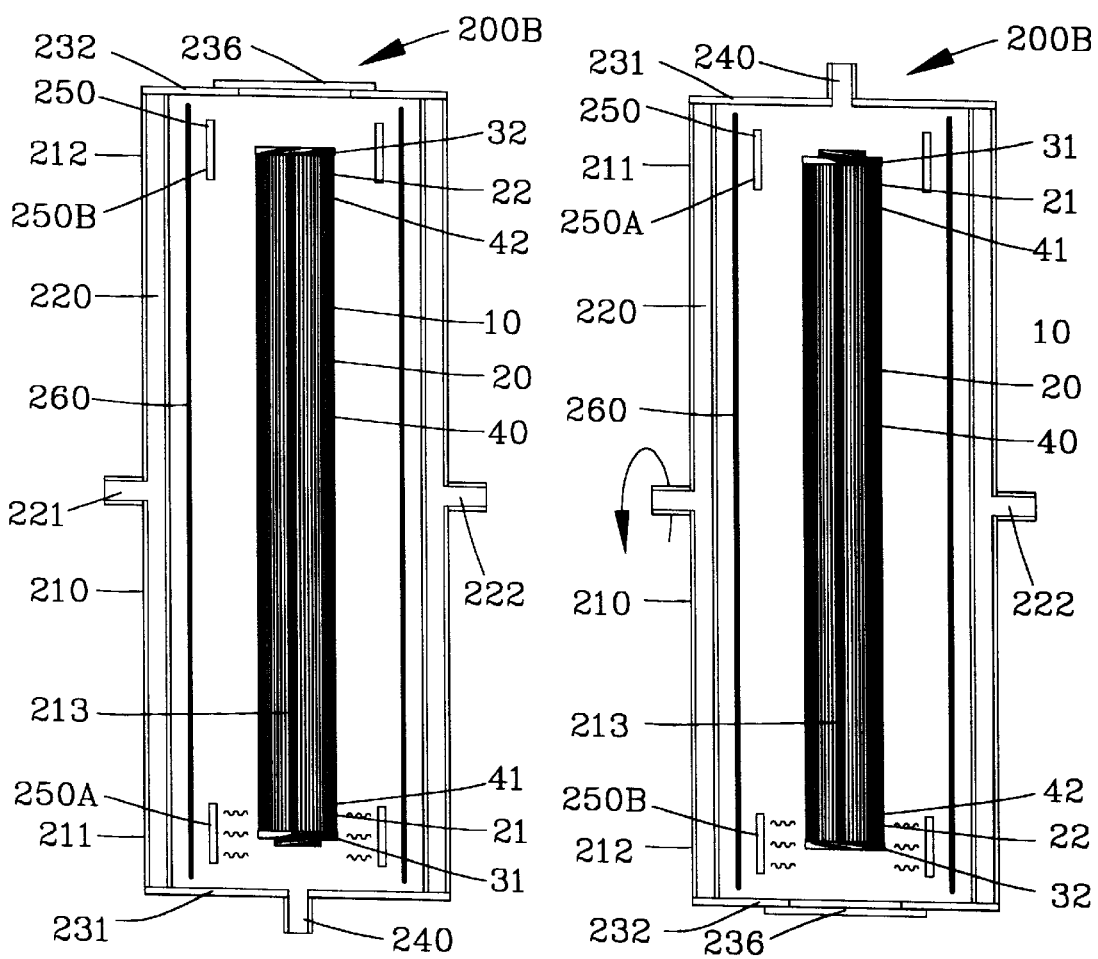
FIG. 9 is a sectional view of a variation of the apparatus of FIG. 5 for irradiating only the first portion of the fluid filter insert for bonding the first endcap to the filter media.
FIG. 10 is a sectional view of the apparatus of FIG. 9 after being inverted for irradiating only the second portion of the fluid filter insert for bonding the second endcap to the filter media.

FIGS. 9 and 10 are sectional views of an apparatus 200B which are further variations of the apparatus 200 illustrated in FIGS. 5–8. In this embodiment of the invention, the array of infrared lamps 250 comprises a first and a second array of infrared lamps 250A and 250B. The first array of infrared lamps 250A is disposed in proximity to the first end 231 of the body 210 whereas the second array of infrared lamps 250B is disposed in proximity to the second end 232 of the body 210. The first and second arrays of infrared lamps 250A and 250B may be independently energized to independently emit infrared radiation.

FIG. 9 illustrates the energizing of the first array of infrared lamps 250A for irradiating the first support member 31. The bonding material 50 is retained within the first annular recess 64 shown in FIG. 3 by action of gravity. The energizing of the first array of infrared lamps 250A at least partially melts the bonding material 50 retained within the first annular recess 64 to secure the first core end 21 of the core member 20 and the first filter media end 41 of the filter media 40 to the first support member 31. The action of gravity inhibits any wicking of the bonding material 50 into the filter media 40 during the heating process.

FIG. 10 is a sectional view of the apparatus 200B of FIG. 9 after being rotated about the input and output conduits 221 and 222 to be in an inverted position. In the inverted position, the second array of infrared lamps 250B is energized for irradiating the second support member 32. The bonding material 50 is retained within the second annular recess 84 shown in FIG. 4 by action of gravity. The energizing of the second array of infrared lamps 250B at least partially melts the bonding material 50 retained within the second annular recess 84 to secure the second core end 22 of the core member 20 and the second filter media end 42 of the filter media 40 to the second support member 32. In the inverted position, the action of gravity inhibits any wicking of the bonding material 50 into the filter media 40 during the heating process.

FIGS. 11–14 are sectional views of an apparatus 300 which is a variation of the apparatus 200 of FIG. 5. The apparatus 300 comprises a body 310 having a first and a second end 311 and 312. Preferably, the body 310 includes a cylindrical cooling reservoir 320 communicating with an input and an output conduit 321 and 322 for enabling a cooling fluid (not shown) to cool the body 310.

The body 310 includes a first and a second cylindrical end wall 331 and 332 defining apertures 334 and 336. The apertures 334 and 336 enable the fluid filter insert 10 to pass through the body 310 on a conveyor 338.

An array of infrared lamps 350 is symmetrically disposed about a cylindrical axis 313 of the body 310. A cylindrical reflector 360 is interposed between the array of infrared lamps 350 and the cooling reservoir 320 to redirect infrared radiation toward the cylindrical axis 313.

FIG. 11 illustrates the fluid filter insert 10 entering the body 310 through the aperture 334 on the conveyor 338. A non-reactive gas or a reactive gas environment may be introduced within the body 210 to surround the fluid filter insert 10. The array of infrared lamps 350 direct infrared energy for heating the fluid filter insert 10.

FIG. 12 illustrates the fluid filter insert 10 moving through the body 310 on the conveyor 338. The entirety of the fluid filter insert 10 is shown disposed within the body 310. The speed of the conveyor 338 and the intensity of the array of infrared lamps 350 is established to at least partially melt the array of bonding material 50 to sinter bond the first and second core ends 21 and 22 of the core member 20 and the first and second filter media ends 41 and 42 of the filter media 40 to the first and second support members 31 and 32. The entirety of the fluid filter insert 10 is irradiated by the array of infrared lamps 350, the infrared energy is applied to the filter media 40. The infrared energy applied to the filter media 40 provides a supplemental sintering of the filter media 40.

FIG. 13 illustrates the fluid filter insert 10 being discharged from the body 310 through the aperture 336 on the conveyor 338. The fluid filter insert 10 may pass through an optional non-reactive gas or a reactive gas environment during the cooling of the fluid filter insert 10.

FIG. 14 illustrates a second fluid filter insert 10 entering the body 310 through the aperture 334 on the conveyor 338. It should be appreciated by those skilled in the art that the apparatus 300 is specifically adapted for a continuous process.

FIGS. 15–18 are sectional views of an apparatus 400 which is a variation of the apparatus 200 of FIG. 5. The apparatus 400 comprises a first and a second body 410A and 410B. The first and second bodies 410A and 410B are moveable relative to one another as shown in FIGS. 15–18.

The first body 410A includes a first cylindrical cooling reservoir 420A communicating with an input and an output conduit 421A and 422A for enabling a cooling fluid (not shown) to cool the first body 410A. The first body 410A defines an aperture 434A adapted to receive the first support member 31. A first gas port 440A is provided for removing and/or replacing the atmosphere internal the first body 410A.

A first array of infrared lamps 450A is symmetrically disposed within the first body 410A. A first cylindrical reflector 460A is interposed between the first array of infrared lamps 450A and the first cooling reservoir 420A to redirect infrared radiation as described heretofore.

The second body 410B includes a second cylindrical cooling reservoir 420B communicating with an input and an output conduit 421B and 422B for enabling a cooling fluid (not shown) to cool the second body 410B. The second body 410B defines an aperture 434B adapted to receive the second support member 32. A second gas port 440B is provided for removing and/or replacing the atmosphere internal the first body 410B.

A second array of infrared lamps 450B is symmetrically disposed within the second body 410B. A second cylindrical reflector 460B is interposed between the second array of infrared lamps 450B and the second cooling reservoir 420B to redirect infrared radiation as described heretofore.

Figure 15:
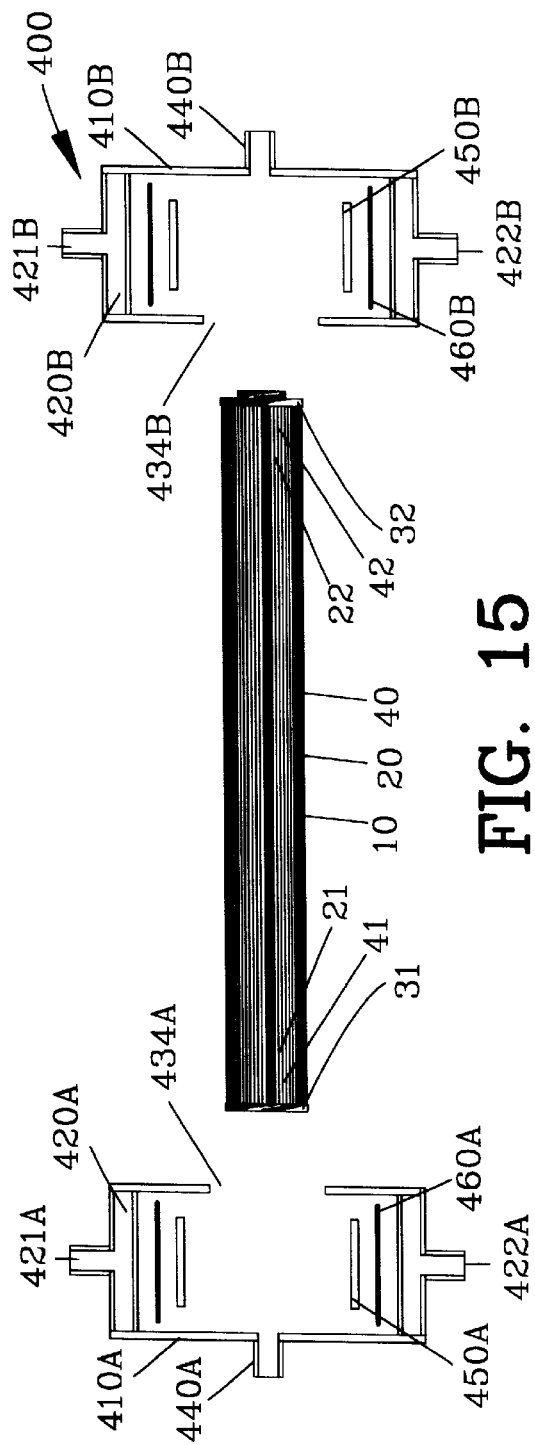
FIG. 15 is a sectional view of a variation of the apparatus of FIG. 5 positioned adjacent opposed ends of a fluid filter insert.
Figure 16:
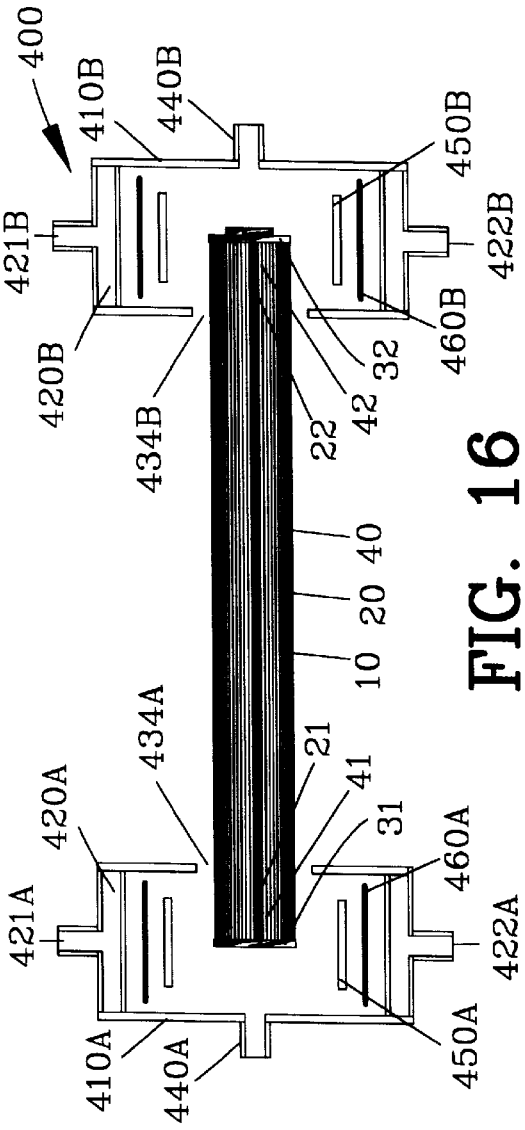
FIG. 16 is a view similar to FIG. 15 illustrating the movement of the apparatus for enclosing the opposed ends of the fluid filter insert.

FIG. 16 is a view similar to FIG. 15 illustrating the movement of the first and second bodies 410A and 410B for receiving the first and second support members 31 and 32 of the fluid filter insert 10 through the apertures 434A and 434B.

Figure 17:
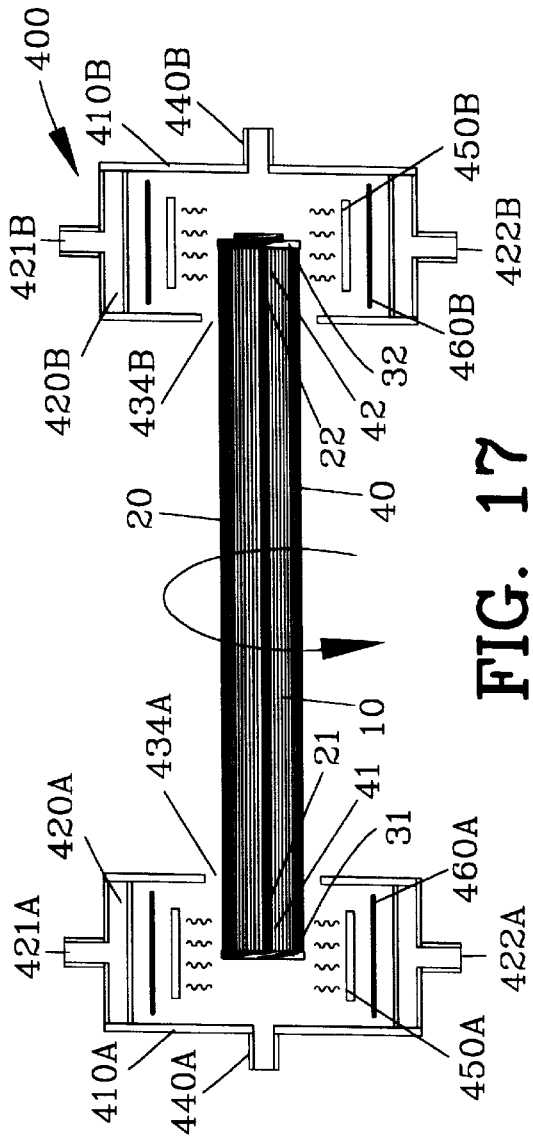
FIG. 17 is a view similar to FIG. 16 illustrating the irradiation of the opposed ends of the fluid filter insert.

FIG. 17 is a view similar to FIG. 16 illustrating the first and second arrays of infrared lamps 450A and 450B irradiating the first and second support members 31 and 32. The first and second arrays of infrared lamps 450A and 450B are energized for a period of time sufficient to at least partially melt the array of bonding material 50 to sinter bond the first and second core ends 21 and 22 of the core member 20 and the first and second filter media ends 41 and 42 of the filter media 40 to the first and second support members 31 and 32. The fluid filter insert 10 may be rotated during the infrared irradiation as indicated by the arrow. The rotation of the fluid filter insert 10 during the infrared irradiation assists in retaining the bonding material 50 within the first and second annular recesses 64 and 84 when the bonding material 50 is in a melted state.

Figure 18:
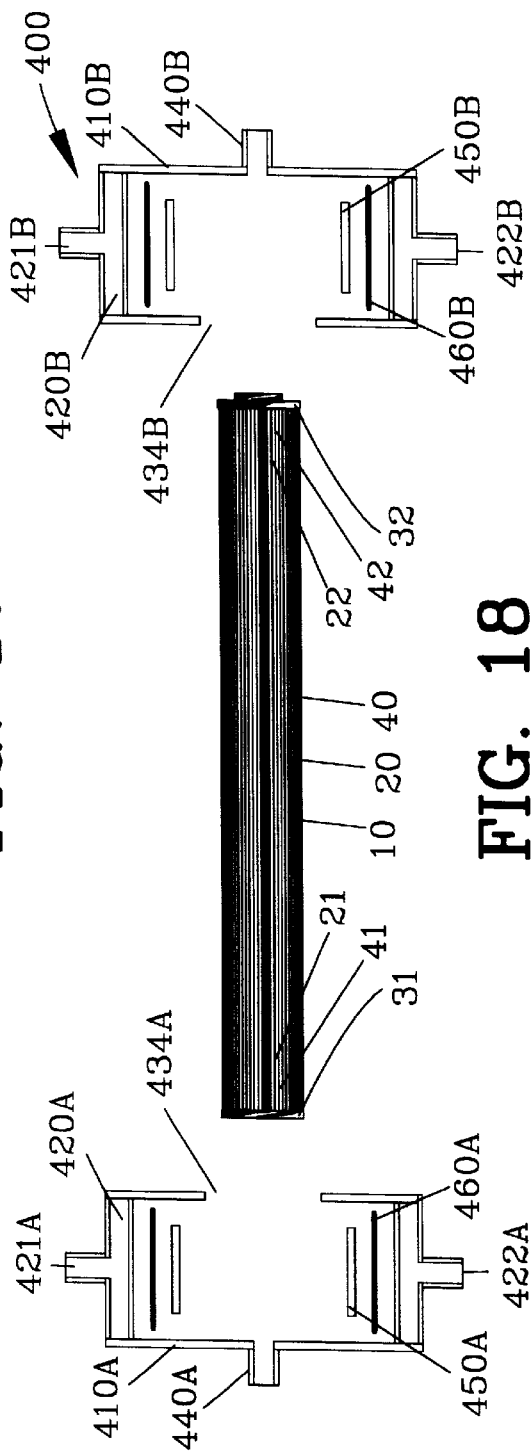
FIG. 18 is a view similar to FIG. 17 illustrating the movement of the apparatus away from the opposed end of the fluid filter insert.

FIG. 18 is a view similar to FIG. 17 illustrating the movement of the first and second bodies 410A and 410B away from the first and second support members 31 and 32 of the fluid filter insert 10.

The apparatus and method of the present invention seals the filter element 40 to the support member 31 through the use of infrared heating which may be concentrated or focused on desired regions of a filter assembly 10. The concentration of infrared heat controls the movement of the binding material 50 during the heating process. The concentration of infrared heat inhibits the migration or wicking of the binding material 50 into the filter media 40 during the heating process. The improved apparatus and method of infrared heating enables the sealing both a first and a second end 41 and 42 of the cylindrical filter media 40 to the first and second end caps 31 and 32 during a single infrared heating process. In addition, the apparatus and method of the present invention enables the use of a brazing material as the bonding material 50 without the need of a binder material for controlling the position and migration of the braze material during the heating process.

In the alternative, the improved apparatus and method enables the sealing a filter element 40 to the support member 31 with infrared heating using metallic fibers 90 of the same material type as the filter media 40 and the support member 31. The metallic fibers 90 may be loose metallic fibers, or a sintered bonding pad of partially sintered metallic fibers.

The application of infrared heat melts the surface of each of the bonding fibers to bond the surface of each of the metallic bonding fibers to the surface of adjacent metallic bonding fibers 110. In addition, the melted surfaces of the metallic bonding fibers bond to the surfaces of the matrix of the small diameter metallic fibers of the filter media 40. Furthermore, the melted surfaces of the metallic bonding fibers bond to the surface of the first and second support members 31 and 32.

The sinter bonding of the core member 20 and the filter media 40 to the first and second support members 31 and 32 exhibits a bond strength substantially equal to the cohesion strength of the filter media 40. Furthermore, the sinter bonding of the core member 20 and the filter media 40 to the first and second support members 31 and 32 exhibits a bubble point leakage substantially equal to the filter media 40.

In one example of the present invention, the core member 20 and the first and second support members 31 and 32 were fabricated from unitary pieces of 304L stainless steel. The metallic bonding material 50 was stainless steel fibers.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. The method of sealing a filter element to a support member, comprising the steps of:
    interposing an array of bonding fibers between the filter element and the support member;
    applying infrared energy for a period of time sufficient to at least partially melt the array of bonding fibers to sinter bond the filter element to a support member.

2. The method of sealing a filter element to a support member as set forth in claim 1, wherein the step of interposing an array of bonding fibers includes interposing an array of metallic bonding fibers.

3. The method of sealing a filter element to a support member as set forth in claim 1, wherein the step of interposing an array of bonding fibers includes interposing a resilient pad formed from a sintered matrix of randomly oriented fibers between the filter element and the support member.

4. The method of sealing a filter element to a support member as set forth in claim 1, wherein the step of interposing an array of bonding fibers includes interposing an array of randomly oriented stainless steel fibers.

5. The method of sealing a filter element to a support member as set forth in claim 1, wherein the step of applying infrared energy includes irradiating with infrared radiation having a wavelength greater than 7000 angstroms.

6. The method of sealing a filter element to a support member as set forth in claim 1, wherein the step of applying infrared energy includes irradiating with infrared radiation for a period of time sufficient to sinter bond each of the fibers of the array of bonding fibers to an adjacent fiber.

7. The method of sealing a filter element to a support member as set forth in claim 1, wherein the step of applying infrared energy includes irradiating with infrared radiation in a vacuum.

8. The method of sealing a filter element to a support member as set forth in claim 1, wherein the step of applying infrared energy includes irradiating with infrared radiation in a reactive atmosphere.

9. The method of sealing a filter element to a support member as set forth in claim 1, wherein the step of applying infrared energy includes irradiating with infrared radiation in a non-reactive atmosphere.

10. The method of sealing a filter element to a support member as set forth in claim 1, wherein the step of applying infrared energy includes irradiating with infrared radiation in a hydrogen atmosphere.

11. The method of making a fluid filter assembly for filtering a fluid, comprising the steps of:
    fabricating a filter media from a matrix of metallic fibers;
    providing a support member;
    interposing an array of metallic bonding fibers between the filter element and the support member; and
    applying infrared energy to at least partially melt the array of metallic bonding fibers to sinter bond the filter element to the support member.

12. The method of making a fluid filter assembly for filtering a fluid as set forth in claim 11, wherein the step of fabricating the filter media comprises sintering a matrix of randomly oriented metallic fibers to provide a porous filter media for filtering the fluid.

13. The method of making a fluid filter assembly for filtering a fluid as set forth in claim 11, wherein the step of fabricating the filter media comprises drawing metallic fibers in a wire drawing process to provide a uniform diameter thereof; and
    forming a matrix of randomly oriented metallic fibers to provide a porous filter media for filtering the fluid.

14. The method of making a fluid filter assembly for filtering a fluid as set forth in claim 11, wherein the step of interposing an array of metallic bonding fibers between the filter element and the support member includes positioning randomly oriented metallic fibers between the filter media and the support member.

15. The method of making a fluid filter assembly for filtering a fluid as set forth in claim 11, wherein the step of interposing an array of metallic bonding fibers between the filter element and the support member includes positioning a resilient pad formed from a sintered matrix of randomly oriented metallic fibers between the filter element and the support member.

16. The method of making a fluid filter assembly for filtering a fluid as set forth in claim 11, wherein the step of interposing an array of metallic bonding fibers between the filter element and the support member includes positioning a first and a second layer between the filter element and the support member with the first layer comprising loose randomly oriented metallic fibers with the second layer comprising a resilient pad formed from a sintered matrix of randomly oriented metallic fibers.

17. The method of making a fluid filter assembly for filtering a fluid as set forth in claim 11, wherein the step of applying infrared energy includes applying heat for melting at least the surface of each of the metallic bonding fibers.

18. The method of making a fluid filter assembly for filtering a fluid as set forth in claim 11, wherein the step of applying infrared energy includes applying infrared energy in a hydrogen atmosphere for melting at least the surface of each of the metallic bonding fibers.

* * * * *